United States Patent [19]

Garoff et al.

[11] Patent Number: 5,663,248
[45] Date of Patent: Sep. 2, 1997

[54] PROCATALYST COMPONENT BASED ON A TRANSITION METAL COMPOUND ON A CARRIER OF MAGNESIUM CHLORIDE AND MANGANESE HALIDE

[75] Inventors: Thomas Garoff, Helsinki; Timo Leinonen, Tolkkinen; Eero Iiskola, Porvoo, all of Finland

[73] Assignee: Borealis Holding A/S, Lyngby, Denmark

[21] Appl. No.: 211,316

[22] PCT Filed: Oct. 1, 1992

[86] PCT No.: PCT/FI92/00265

§ 371 Date: Jun. 1, 1994

§ 102(e) Date: Jun. 1, 1994

[87] PCT Pub. No.: WO93/07181

PCT Pub. Date: Apr. 15, 1993

[30] Foreign Application Priority Data

Oct. 2, 1991 [FI] Finland .................... 914626

[51] Int. Cl.⁶ .................... C08F 4/646
[52] U.S. Cl. .................... 526/114; 526/113; 526/124.9; 526/125.3; 526/125.6; 526/351; 502/107; 502/111; 502/113; 502/169
[58] Field of Search .................... 502/107, 111, 502/113, 169; 526/113, 114

[56] References Cited

U.S. PATENT DOCUMENTS

| | | | |
|---|---|---|---|
| 4,061,857 | 12/1977 | Kuroda et al. | 526/114 |
| 4,093,789 | 6/1978 | Kuroda et al. | 526/114 |
| 4,336,360 | 6/1982 | Giannini et al. | 526/114 |
| 4,392,983 | 7/1983 | Hartshorn et al. | 526/114 |
| 4,506,029 | 3/1985 | Band | 502/111 |
| 4,829,034 | 5/1989 | Iiskolan et al. | 302/9 |

FOREIGN PATENT DOCUMENTS

| | | |
|---|---|---|
| 2600688 | 7/1976 | Germany . |
| 2636380 | 2/1977 | Germany . |

*Primary Examiner*—Romulo H. Delmendo
*Attorney, Agent, or Firm*—Birch, Stewart, Kolasch & Birch, LLP

[57] ABSTRACT

Olefin polymerization catalysts the procatalyst component of which comprises a transition-metal compound on a magnesium chloride support material are known to all. Now the procatalyst component has been improved by incorporating a manganese (II) halide into it at a rate of at minimum approx. 0.1% and at maximum approx. 50% of the total molar amount of magnesium chloride and manganese (II) halide. The new polymerization catalyst has, among other things, the excellent special property that it yields a polyolefin with a broad molecular weight distribution.

30 Claims, 7 Drawing Sheets

FIG. 14

PROCATALYST COMPONENT BASED ON A TRANSITION METAL COMPOUND ON A CARRIER OF MAGNESIUM CHLORIDE AND MANGANESE HALIDE The invention relates to an olefin polymerization catalyst the procatalyst component of which comprises a transition-metal compound on a support material of magnesium chloride. The invention also relates to a method for preparing a procatalyst component for an olefin polymerization catalyst of the said type, wherein a) a magnesium chloride and a lower alcohol are contacted and the mixture is melted,
b) the molten mixture is atomized, and it is solidified by cooling to produce support material particles, and
c) the support material particles are caused to react with a transition-metal compound.

Furthermore, the invention relates to the use of an olefin polymerization catalyst of the said type for the preparation of polypropylene, and preferably a polypropylene with a broad molecular weight distribution.

α-olefins are often polymerized using a Ziegler-Natta catalyst system made up of a so-called procatalyst and a cocatalyst. Of these, the procatalyst component is based on a compound of a transition metal belonging to any of Groups IVA–VIII in the Periodic Table of the Elements, and the cocatalyst component is based on an organometallic compound of a metal belonging to any of Groups IA–IIIA in the Periodic Table of the Elements (the groups are defined according to Hubbard, i.e. IUPAC). The catalyst system may also include a support material on which the transition-metal compound is deposited and an internal electron donor which enhances and modifies the catalytic properties and is deposited on the support material together with the transition-metal compound. In addition, a separate so-called external electron donor can also be used together with the procatalyst and the cocatalyst.

The Ziegler-Natta catalysts used for polypropylene polymerization usually produce a polymer having a narrow molecular weight distribution. This material is very suitable for injection molding purposes. However, there are several uses in which a broad molecular weight distribution is required. Especially if a higher melt strength is desired, a wider range of polymer chain lengths would be an advantage. If it is assumed that polymerization takes place at specific so-called active sites in the catalyst, active sites of the same type will produce a polymer material of the same type, in which case the uniformity is seen as a narrow molecular weight distribution. Since a broader molecular weight distribution is required for a number of uses of polypropylene, efforts have been made to prepare catalysts with active sites of a variety of types.

JP application publication 79037911 describes the preparation of a polyolefin having a wide molecular weight distribution by using an active and new procatalyst which is made up of a titanium and/or vanadium compound on a support material. The first component is obtained by treating aluminum oxide with sulfur dioxide, and the other component contains a magnesium halide, a manganese halide, and an organic compound of a metal such as aluminum or zinc, e.g. $MgCl_2MnCl_2$—$Al(OR_3)$.

By this known method it has been possible, for example, to improve the casting properties of the polymer, but the process for preparing the catalyst is too complicated and unconventional in order to be commercially usable.

The object of the present invention is to provide a catalyst comprising a transition-metal compound on a magnesium chloride support material for producing polyolefins having a broad molecular weight distribution. Another aim is a maximal catalyst activity and a suitable catalyst morphology, which will also be reflected in the morphology of the polymer product. The invention also aims at an improved method for the production of an olefin polymerization catalyst of the said type.

These objects have now been achieved with a new olefin polymerization catalyst, the procatalyst component of which has been prepared by (a) contacting magnesium chloride and a lower alcohol and melting the mixture, (b) atomizing the molten mixture and solidifying it by cooling to produce support material particles, (c) reacting the support material particles with a transition metal compound, characterized by adding manganese (II) halide at stage (a) at a rate of a minimum of approximately 0.1% and a maximum of approximately 50% of the total molar amount of magnesium chloride and manganese (II) halide. The objects have further been achieved with a new method for the production of a procatalyst component for an olefin polymerization catalyst, wherein (a) magnesium chloride and a lower alcohol are contacted, and the mixture melted, (b) the molten mixture is atomized, and solidified by cooling to produce support material particles, and (c) the support material particles are reacted with a transition metal component, characterized in that manganese (II) halide is added during step (a) at a rate at a minimum of approximately 0.1% and a maximum of approximately 50% of the total molar amount of magnesium chloride and manganese (II) halide.

It has thus been realized that an olefin polymerization catalyst more suitable for the above-mentioned use is obtained if manganese (II) halide is incorporated into its magnesium chloride support material at a rate of at minimum approx. 0.1%, and at maximum approx. 50%, of the total molar amount of magnesium chloride and manganese (II) halide. It is preferable that the minimum concentration of manganese (II) halide is approx. 5% of the total molar amount of magnesium chloride and manganese (II) halide. The maximum concentration of manganese (II) halide is preferably approx. 40% of the total molar amount of magnesium chloride and manganese (II) halide. It is even more preferable that the maximum concentration of manganese (II) halide is less than 30%, and preferably approx. 10%, of the said the said total molar amount.

The active part of the catalyst, i.e. the transition-metal compound, is preferably a titanium compound, such as a titanium alkoxide, a titanium alkoxyhalide or a titanium halide, or a vanadium compound, such as a vanadium oxyhalide or a vanadium halide. The most preferable transition-metal compound is titanium tetrachloride.

The manganese (II) halide is selected so that with respect to its ion radii it fits as well as possible into the crystal lattice of magnesium chloride. It has been observed that the most advantageous manganese (II) halide is manganese chloride. The said advantageous concentrations have specifically been measured using manganese (II) chloride, but similar results are probably attainable also using other manganese (II) halides.

A preferred composition, based on weight, of the procatalyst component for the polymerization catalyst according to the invention is, not including the organometallic cocatalyst used in the polymerization, as follows: magnesium 10–20%, manganese 1–10%, titanium 2–4%, and chlorine 45–60%, calculated from the total weight of the supported procatalyst component.

According to one embodiment of the invention, on the magnesium chloride support material there is, in addition to the transition-metal compound, also an internal donor, which is preferably an aromatic ester of the type of di-isobutyl phthalate. Benzoic acid esters are also possible. The concentration of this internal donor may be 10–25% of the weight of the procatalyst component in the catalyst.

The catalyst according to the invention preferably also contains an organometallic cocatalyst, which is preferably a trialkyl aluminum, preferably triethyl aluminum. In order to improve, for example, stereoselectivity, a so-called external donor may also be added to the catalyst; the external donor may be silane, cineole or ether, preferably cyclohexyl-methylmethoxysilane, cineole, or diphenyl-dimethoxysilane.

The solid part of the catalyst according to the invention is in the form of substantially spherical particles having a diameter within a range of approx. 100–400 µm.

As was already mentioned, the invention also relates to a method for the preparation of a procatalyst component for an olefin polymerization catalyst. In the method, magnesium chloride and a lower alcohol are contacted and melted, the molten mixture is atomized and solidified by cooling to produce support material particles, and the support material particles are reacted with a transition-metal compound to produce an active procatalyst. In the invention it has been realized that a broader molecular weight distribution can be obtained by adding to the magnesium chloride and the lower alcohol a manganese (II) halide at a rate of at minimum approx. 0.1% and at maximum approx. 50% of the total molar amount of magnesium chloride and manganese (II) halide. This addition takes place before the solidification and thus yields a homogenous procatalyst doped with manganese.

In the first step, i.e. step a), the magnesium chloride and the lower alcohol are contacted and the mixture is melted, and in the second step, i.e. in step b), the melt is atomized and it is solidified by cooling it to produce support material particles. These steps a) and b) are preferably carried out by suspending a finely-divided magnesium chloride and a finely-divided manganese (II) halide, preferably manganese (II) chloride, into an inert, heat-resistant medium. Then a lower alcohol is added to the suspension and the suspension is heated until the mixture made up of the said salts and alcohol melts, forming melt drops in the medium. After the said steps, the medium with its melt drops is contacted with a cold liquid, which dissolves the medium and solidifies the melt drops into finished support material particles.

As is evident from the description of the catalyst, compounds of titanium and vanadium are preferred transition-metal compounds, and the most preferred one is titanium tetrachloride. Manganese (II) chloride is a preferred manganese (II) halide.

Manganese (II) halide (preferably chloride) is preferably added to step a) at a rate of at minimum 5% of the total molar amount of magnesium chloride and manganese (II) halide (preferably chloride). Manganese (II) halide (preferably chloride) is added to step a) at a rate of at maximum approx. 40% of the total molar amount of magnesium chloride and manganese (II) halide (preferably chloride). It is most preferable to add manganese (II) chloride to step a) at a rate of at maximum approx. 30% and preferably approx. 10% of the total molar amount of magnesium chloride and manganese (II) chloride.

The lower alcohol used in step a) is preferably methanol and/or ethanol, and most preferably ethanol.

The solid support material obtained from step b) in the form or particles is caused to react with a transition-metal compound in step c). As was already mentioned, the most preferred transition-metal compound is titanium tetrachloride. According to one preferred embodiment, step c) is carried out by causing the support material particles to react not only with the transition-metal compound but also with an internal electron donor, in which case the electron donor used is preferably an aromatic ester such as di-isobutyl phthalate.

According to one embodiment, the catalyst according to the invention is used for producing a polypropylene having a broad molecular weight distribution. In this case, the said procatalyst is combined with an organometallic cocatalyst and preferably also an external donor, which may be, for example, silane, cineole, ether or other such external donor commonly known in the art.

Embodiment examples 3, 4 and 5, as well as comparison examples 1 and 6, are presented below in order to elucidate the invention.

EXAMPLES

Examples 1 and 6 are comparison examples, in which the molar concentrations of manganese are respectively 0 and 100%. In the corresponding embodiment examples 2, 3, 4, and 5, the manganese concentrations in the support material were respectively 3, 10, 30, and 60 mol-%.

The accompanying FIGS. 1–14 depict the following:

PREPARATION OF SUPPORT MATERIAL

1–30 g of magnesium chloride and manganese (II) chloride were suspended at room temperature into 600 ml of silicone oil in a reactor. Agitation was continued for half an hour in order to achieve equilibrium conditions. Thereafter 56 ml of dry ethanol was added, drop by drop, and the mixture was gradually heated to 40° C. The solution was again allowed to reach an equilibrium, whereafter the temperature was raised to 123°–132° C. Thereafter, ethanol was added until the salt mixture became liquid. Then vigorous agitation was used in order to distribute the liquid melt drops evenly into the silicone oil. When a clear salt melt had been achieved, the hot silicone oil mixture was siphoned through a teflon tube into a reactor containing 1 liter of cold heptane (−30° C.). The melt drops of the metal salt mixture solidified in this cold solution. In order to remove the silicone oil, the solids were washed three times with 600 ml of heptane. Ultimately, the support material was vacuum dried.

In the preparation of the support material it became evident that manganese (II) chloride had a lower solubility in ethanol than had magnesium chloride. Ethanol must be added to certain mixtures in order to bring the salt into a molten state. Approx. twice as much ethanol had to be added in order to bring mixtures containing more than 10 mol-% manganese into a molten state in a silicone bath. The chemicals added are listed in Table 1, and Table 2 shows the magnesium and manganese concentrations in the support material produced. The molar percentages in Table 2 were calculated from the total molar amount of the metals, and the corresponding weight percentages from the total weight of the support material.

TABLE 1

Chemicals added in the production of support materials

| Example | $MgCl_2$ added (g) | $MnCl_2$ added (g) | Ethanol added (ml) |
|---|---|---|---|
| 1 (comparison) | 30.0 | 0 | 56 |
| 2 (embodiment) | 29.1 | 1.2 | 56 |
| 3 (embodiment) | 27.0 | 4.0 | 101 |
| 4 (embodiment) | 21.0 | 12.0 | 56 |
| 5 (embodiment) | 12.0 | 24.0 | 95 |
| 6 (comparison) | 0 | 39.6 | 92 |

TABLE 2

Calculated chemical composition of the support material as compared with the concentrations obtained in the product

| Example | Calculated mol-% Mn | Weight % Mn detected | Mol-% Mn detected | Weight-% Mg detected | Mol-% Mg detected |
|---|---|---|---|---|---|
| 1 (comp.) | 0 | 0 | 0 | 10.4 | 100.0 |
| 2 (emb.) | 3 | 0.8 | 3.1 | 10.4 | 96.9 |
| 3 (emb.) | 10 | 1.6 | 10.0 | 6.5 | 90.1 |
| 4 (emb.) | 30 | 6.8 | 29.2 | 7.3 | 70.8 |
| 5 (emb.) | 60 | 14.3 | 57.9 | 4.6 | 42.1 |
| 6 (comp.) | 100 | 28.8 | 100.0 | 0.0 | 0.0 |

Figure 1:
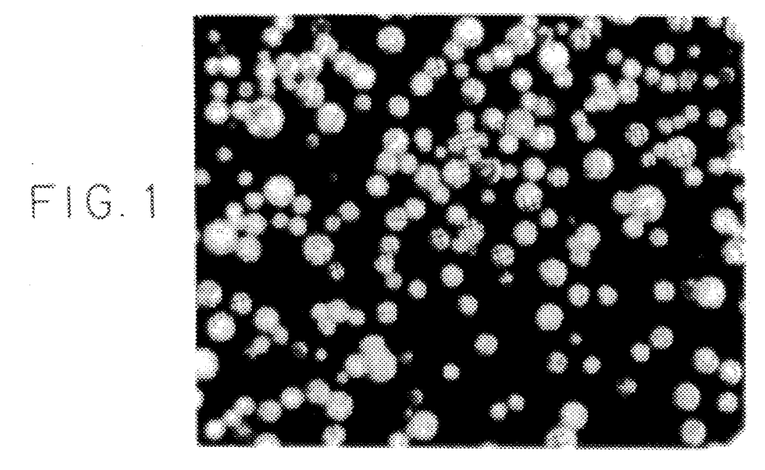
FIG. 1. The morphology of the $MgCl_2 \cdot EtOH$ support material doped with 3% $MnCl_2$.
Figure 2:
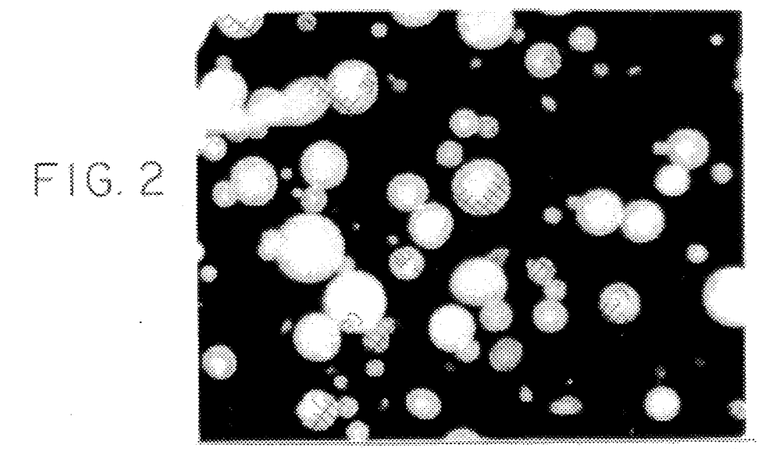
FIG. 2. The morphology of the $MgCl_2 \cdot EtOH$ support material doped with 10% $MnCl_2$.
Figure 3:
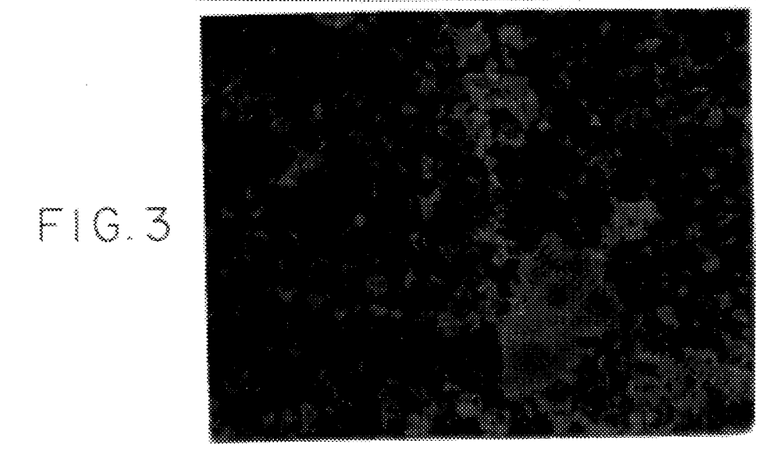
FIG. 3. The morphology of the $MnCl_2 \cdot EtOH$ support material.
Figure 4:
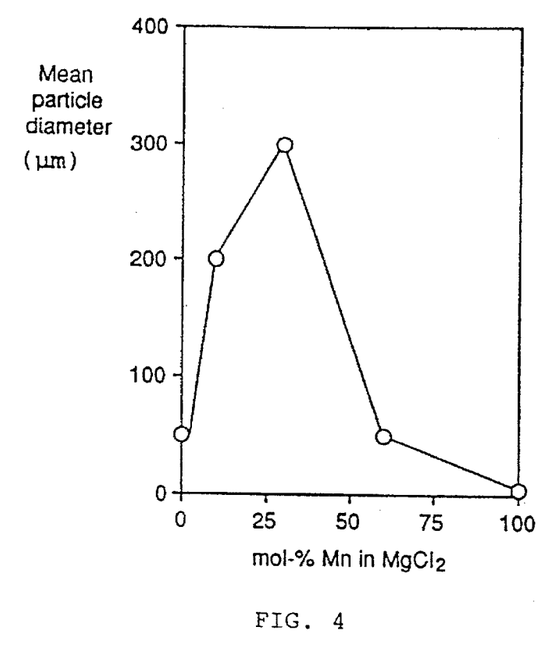
FIG. 4. The mean particle diameter of the support material as a function of the Mn concentration (mol-%) in $MgCl_2$.

The morphology of the support material obtained was such that a higher manganese amount added to the salt mixture hampered the bringing of the mix into a liquid or molten state. The molten material was in this case also more viscous. Since the mixing conditions in the silicone bath in the different examples were identical, a higher melt viscosity also yielded larger support material particles. This increase in the particle diameter continued up to a manganese concentration of 30%. Thereafter the liquid melt drops were no longer capable of forming spherical particles. This change in particle morphology can be seen in FIGS. 1–3. The first figure shows the morphology of a material doped with 3 percent manganese. The morphology of this material resembles that of a conventional magnesium chloride support material, and the mean particle diameter is approx. 50 μm. The next of these figures shows enlarged particles of a material doped with 10% manganese, and the last one shows a crystalline material prepared from pure manganese (II) chloride. Table 3 lists the mean particle sizes, and they are also shown graphically in FIG. 4. Table 3 also shows the general morphological character and color of the products.

TABLE 3

Mean particle size diameter of the support material as a function of the mol-% of Mn in $MnCl_2$, as well as the color and morphology of the material

| Example | Mol-% Mn in support material | Catalyst particle diameter (μm) | Color | Morphology |
|---|---|---|---|---|
| 1 (comp.) | 0 | 50 | W | S |
| 2 (emb.) | 3 | 50 | SG | S |
| 3 (emb.) | 10 | 200 | SG | A |
| 4 (emb.) | 30 | 300 | LT | S |
| 5 (emb.) | 60 | 50 | T | G |
| 6 (comp.) | 100 | 5 | GR | C |

Color:
W = white
SG = slightly green
LT = light turquoise
T = turquoise
GR = green
Morphology:
S = spherical
A = agglomerate
G = granular
C = crystalline Production of Procatalyst 0.1 mol of the mixed salt support material prepared in the manner described above was suspended in inert conditions into 150 ml of heptane, and the suspension was agitated for half an hour. The suspension was cooled to −15° C. Then 300 ml of cold titanium tetrachloride was added and the temperature was raised slowly to +20° C. 5.3 ml of an internal donor (di-isobutyl phthalate, DIBP) was added to the reaction mixture. The temperature was raised, according to the gradient, to the boiling point of the solution. After the boiling point of the reaction solution had been reached, the normal catalyst synthesis path was followed.

The catalyst synthesis was carried out without difficulty. The only difference as compared with conventional catalyst synthesis was in the color of the reaction solution. Thereafter, the chemical composition of the procatalyst was measured. The measurement results are presented in Table 4.

TABLE 4

Chemical compositions of magnesium-doped catalysts

| Example | Mol-% Mn added | Weight-% Mg | Weight-% Mn | Weight-% Ti | Weight-% Cl |
|---|---|---|---|---|---|
| 1 (comp.) | 0 | 16.0 | 0.0 | 4.4 | 56.0 |
| 2 (emb.) | 3 | 16.8 | 1.2 | 2.9 | 56.9 |
| 3 (emb.) | 10 | 15.3 | 3.8 | 3.3 | 56.2 |
| 4 (emb.) | 30 | 11.1 | 6.0 | 2.6 | 53.3 |
| 5 (emb.) | 60 | 5.7 | 18.6 | 3.2 | 49.1 |
| 6 (comp.) | 100 | 0.1 | 36.3 | 2.3 | 55.0 |

Figure 5:
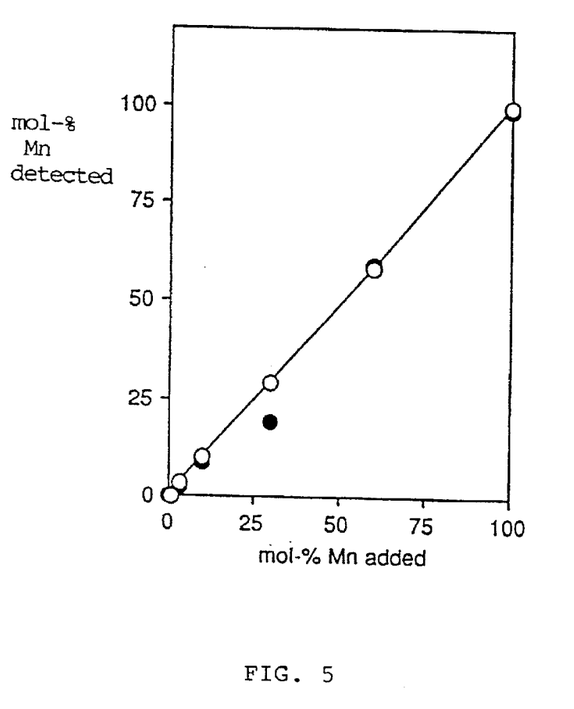
FIG. 5. The correlation between the molar percentage of the manganese added and the molar percentage detected in the product and in the catalyst.

The results showed that the amount of manganese fed in along with the support material correlated quite precisely with the amount of manganese detected in the catalyst. This can be seen clearly in FIG. 5. In it the molar percentage of manganese is shown as a function of the concentration of manganese added. The manganese concentrations in the support material and in the catalyst correlate almost precisely with each other. This result shows that manganese chloride can be added to a mixture of magnesium chloride and ethanol by merely melting the two salts together.

Characterization of the Procatalyst

All of the components of the procatalyst produced were measured. It was also interesting to see whether manganese affected the crystal structure of the support material. Therefore X-ray diffraction patterns of all the procatalysts were taken. In addition, the ratio of the complexed internal donor to the total metal amount in the procatalyst was measured.

In measuring the titanium concentration it was observed that there was no substantial difference in the ability of the support material to bind titanium into the crystal structure when the manganese concentration of the magnesium chloride salt was increased. In the shift from undoped material to the first doped procatalyst (3 mol-%) there occurred a slight decrease from 4.4 weight-% to approx. 3 weight-%, whereafter the titanium concentration remained unchanged as manganese was added to the support material (cf. Table 4).

Figure 6:
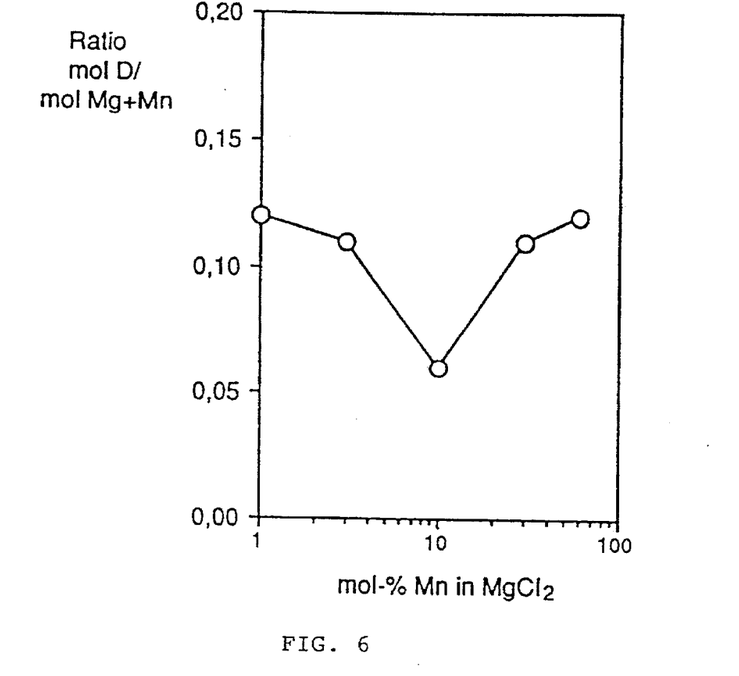
FIG. 6. The proportion of donor bound by the metals (Mg+Mn) in the Mn-doped catalyst.

The donor concentration was also observed by determining the di-isobutyl phthalate concentration in the procatalyst. This was done because it was not known whether manganese was capable of binding internal donor to the same degree as magnesium was. In particular, it was desired to see whether a mixture made up of two salts could retain the normal donor to support material ratio during the synthesis. The ratios are shown in Tables 5 and 6. The final proportion is also seen in FIG. 6. According to the results, the ability of the support material to bind the donor decreased sharply within the middle range of the salt mixture. Thus, a catalyst doped with 10% manganese was capable of binding only 50% of the original donor amount. A 60% manganese (II) chloride material, on the other hand, was capable of binding donor to the same degree as was a pure magnesium chloride material.

TABLE 5

A comparison of the manganese amount added, the manganese concentration in the support material, and the manganese concentration in the catalyst

| Example | Mol-% Mn added to support material | Mol-% Mn detected in support material | Mol-% Mn detected in catalyst |
|---|---|---|---|
| 1 (comp.) | 0 | 0.0 | 0.0 |
| 2 (emb.) | 3 | 3.1 | 3.1 |
| 3 (emb.) | 10 | 10.0 | 9.9 |
| 4 (emb.) | 30 | 29.2 | 19.2 |
| 5 (emb.) | 60 | 57.9 | 58.6 |
| 6 (comp.) | 100 | 100.0 | 99.1 |

TABLE 6

Donor concentrations of manganese-doped procatalysts

| Example | Mol-% Mn added | % DIBP | Mol-% DIBP | Mol-% Mn + Mg | Ratio D/Mn + Mg |
|---|---|---|---|---|---|
| 1 | 0 | 23.0 | 0.083 | 0.71 | 0.12 |
| 2 | 3 | 22.2 | 0.080 | 0.71 | 0.11 |
| 3 | 10 | 12.5 | 0.045 | 0.70 | 0.06 |
| 4 | 30 | 15.5 | 0.056 | 0.57 | 0.10 |
| 5 | 60 | 18.9 | 0.068 | 0.58 | 0.12 |
| 6 | 100 | 0.4 | 0.001 | 0.67 | 0.00 |

DIBP = di-isobutyl phthalate

Figure 7:
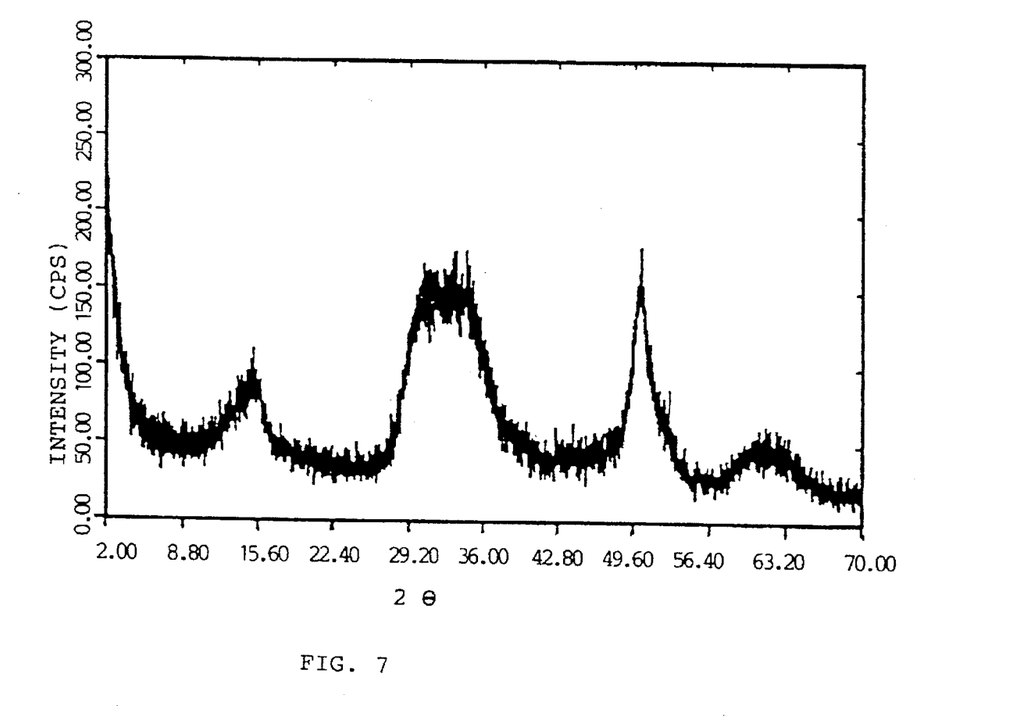
FIG. 7. The X-ray diffraction pattern of a Ziegler-Natta catalyst doped with 10% Mn in a $MgCl_2$ support material.

The dimensions of the doped magnesium chloride crystals were determined by taking X-ray diffraction patterns of all the catalyst samples in order to determine the effect of manganese (II) chloride. It proved to be possible to use manganese up to 30% without the X-ray diffraction pattern of magnesium chloride changing substantially. With these concentrations a normal amorphous magnesium chloride pattern was obtained, in which there was at 15 degrees a small peak indicating the height of the crystal and at 50 degrees a clear peak indicating the width of the crystal (cf. FIG. 7). At higher manganese concentrations, the X-ray pattern of manganese (II) chloride was prevalent and a more crystalline structure was obtained. It was possible to calculate the dimensions of magnesium chloride crystals up to a 30% concentration of manganese. The results are shown in Table 7, and FIG. 7 shows the X-ray diffraction pattern of a catalyst sample doped with 10% manganese.

TABLE 7

Crystal dimensions of Mn-doped catalysts. The heights were measured from a peak at 15° and the widths from a peak at 50°.

| Example | Mol-% Mn added | Height at 15° (nm) | Width at 50° (nm) |
|---|---|---|---|
| 1 | 0 | <3 | 4.6 |
| 2 | 3 | <3 | 5.1 |
| 3 | 10 | <3 | 5.5 |
| 4 | 30 | <3 | 5.2 |
| 5 | 60 | — | — |
| 6 | 100 | — | — |

Test Polymerization

Test polymerizations were carried out on all of the procatalysts. A two-liter bench reactor was used in the test polymerization. 20–30 mg of procatalyst was used for the test polymerization. This amount was mixed with 620 µl of triethyl aluminum and 200 µl of a 25% solution of the external donor cyclohexylmethyl-dimethoxysilane (CHMDMS) in 30 ml of heptane. The polymerizations were carried out at +70° C. and at a propylene monomer pressure of 10 bar. The partial pressure of hydrogen during the polymerization was 0.2 bar. The polymerization was continued for 3 hours. The activity was measured on the basis of the polymerization yield. The soluble part of the polymer was measured by evaporating a measured portion out from the polymerization solution.

Figure 8:
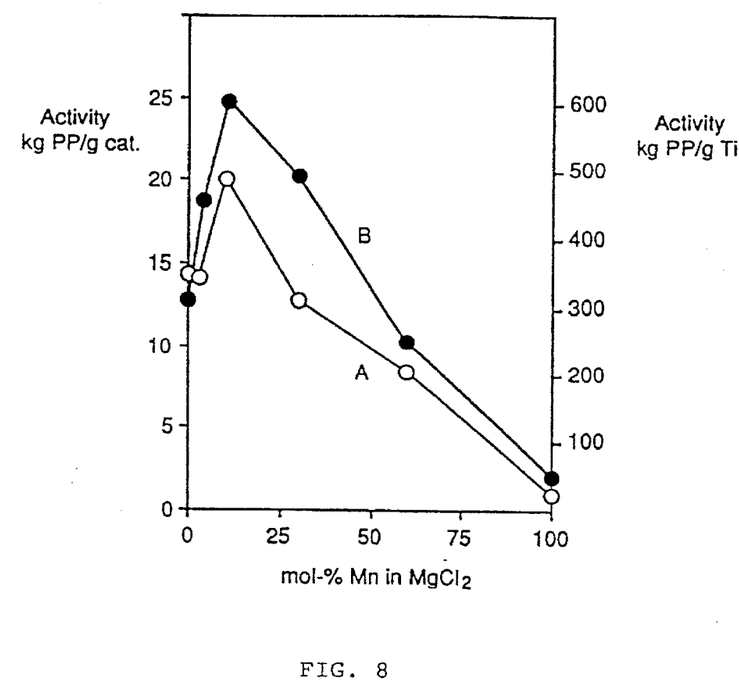
FIG. 8. The activities of Mn-doped Ziegler-Natta catalysts.

As has been stated, the activity was determined by test polymerizing all of the catalysts in the same conditions. Table 8 shows the polymerization results. Activity is here expressed both in kg PP/g cat. and in kg PP/g Ti. The results are also shown graphically in FIG. 8.

TABLE 8

Activity of Mn-doped catalysts

| Example | Mol-% Mn added | Activity kg PP/g cat. | Activity kg PP/g Ti |
|---|---|---|---|
| 1 (comp.) | 0 | 14.3 | 325 |
| 2 (emb.) | 3 | 14.1 | 486 |
| 3 (emb.) | 10 | 20.0 | 606 |
| 4 (emb.) | 30 | 12.8 | 492 |
| 5 (emb.) | 60 | 8.4 | 262 |
| 6 (comp.) | 100 | 1.0 | 43 |

Mn-doping seemed to have a crucial effect on the activity of the catalysts. Doping with 3% manganese yielded almost the same result as an undoped procatalyst, if only the activity unit kg PP/g cat. is considered, but caused an increase up to 25% in the activity when expressed in kg PP/g Ti. The activity increase was greatest when a material doped with 10% manganese was used. In this case activities up to 20 kg PP/g cat. were obtained. Expressed in kg PP/g Ti, the activity increase was in the order of 100%. With higher doping concentrations there was an almost linear activity decrease with increasing manganese concentrations. When pure manganese (II) chloride was used instead of magnesium chloride, the activity was only 10% of the original activity.

TABLE 9

Isotactic indicators of polymer samples produced using Mn-doped procatalysts

| Example | Mol-% Mn added | Isotacticity (%) | Evaporation residue (g) | Isotactic index (%) |
|---|---|---|---|---|
| 1 (comp.) | 0 | 99.3 | 2.4 | 98.8 |
| 2 (emb.) | 3 | 97.6 | 6.1 | 96.2 |
| 3 (emb.) | 10 | 98.4 | 4.1 | 97.7 |
| 4 (emb.) | 30 | 99.0 | 3.1 | 98.2 |
| 5 (emb.) | 60 | 98.5 | 3.0 | 97.3 |
| 6 (comp.) | 100 | 90.5 | 7.7 | 71.2 |

The results indicate that isotacticity remained stable at a high level up to high Mn-doping percentages. Only at a concentration which was above 60 mol-% Mn was there a drastic decrease in isotacticity. When pure manganese (II) chloride was used as the support material, the isotactic index dropped to 70%. At lower doping concentrations (below 60 mol-% manganese) the isotactic index varied only slightly, being within the range 97–98%.

Next, the particle size distributions of the polymers were determined. A catalyst particle without mechanical strength usually collapses during polymerization, and the small products of the collapse also produce fines in the polymer produced. Therefore the particle size distribution was determined on all of the polymer samples in order to determine the mechanical strength of the catalyst particles. The results are shown in Table 10.

TABLE 10

Particle size distributions of the polymers produced using Mn-doped catalysts

| Example | Mn % | 2.0 mm | 1.0 mm | 0.5 mm | 0.18 mm | 0.10 mm | 0.056 mm | 0.036 mm | Fines |
|---|---|---|---|---|---|---|---|---|---|
| 1 (comp.) | 0 | 10.0 | 64.8 | 19.3 | 3.9 | 1.5 | 0.5 | — | — |
| 2 (emb.) | 3 | 46.5 | 50.9 | 2.4 | 0.1 | 0.1 | — | — | — |
| 3 (emb.) | 10 | 10.9 | 65.4 | 21.6 | 1.8 | 0.2 | 0.1 | — | — |
| 4 (emb.) | 30 | 95.9 | 4.0 | — | — | 0.1 | — | — | — |
| 5 (emb.) | 60 | 8.6 | 32.4 | 46.7 | 9.6 | 1.7 | 1.0 | 0.1 | — |

Characterization of the Polymer Samples

Bulk densities and particle size distributions were determined on the polymer samples obtained. Isotacticity was determined by heptane elution, and the isotactic index was determined from the results obtained from evaporation residue measurements. The melt index was determined at 230° C. by using a 2.16 kg weight. To observe the effect of the salt mixture on polydispersity, molecular weight distributions were determined on all of the polymer samples.

Figure 9:
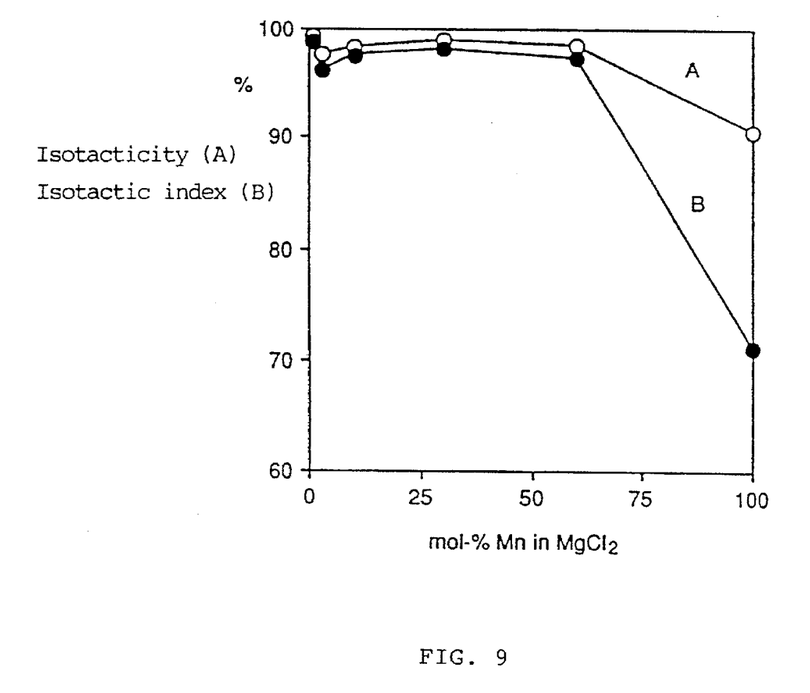
FIG. 9. The isotacticities (A) and isotactic indices (B) of polymers produced using Mn-doped catalysts.

First, the isotacticity and the isotactic indices of the polymer samples were measured. The results are presented in Table 9 and are shown graphically in FIG. 9.

Figure 10:
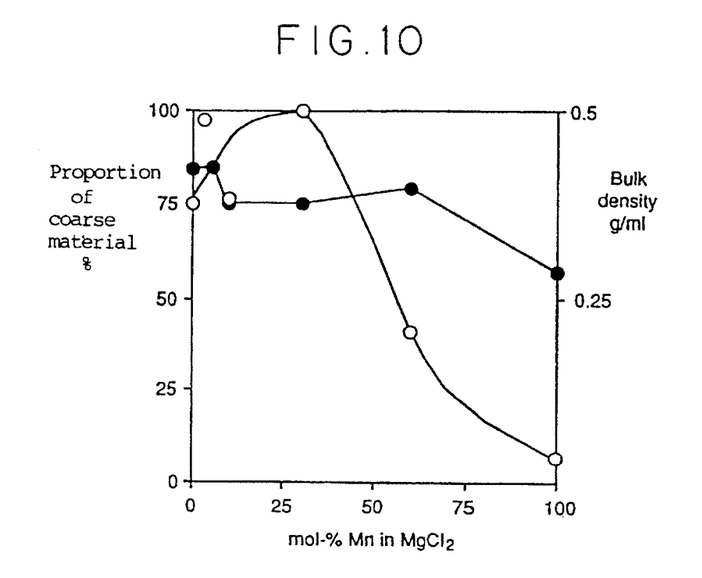
FIG. 10. The bulk density (B) and the percentage (A) of coarse material (d>1 mm) of PP material, as a function of the molar percentage of manganese in the procatalyst.

The polypropylene material produced using Mn-doped catalysts had a very low fines content when the doping percentage was below 30%. This is clearly visible also in FIG. 10. Compared with an undoped catalyst, the catalyst containing manganese 3% contained hardly any particles with diameters smaller than 1 mm. A catalyst having a doping percentage of 30% yields even better results.

Figure 11:
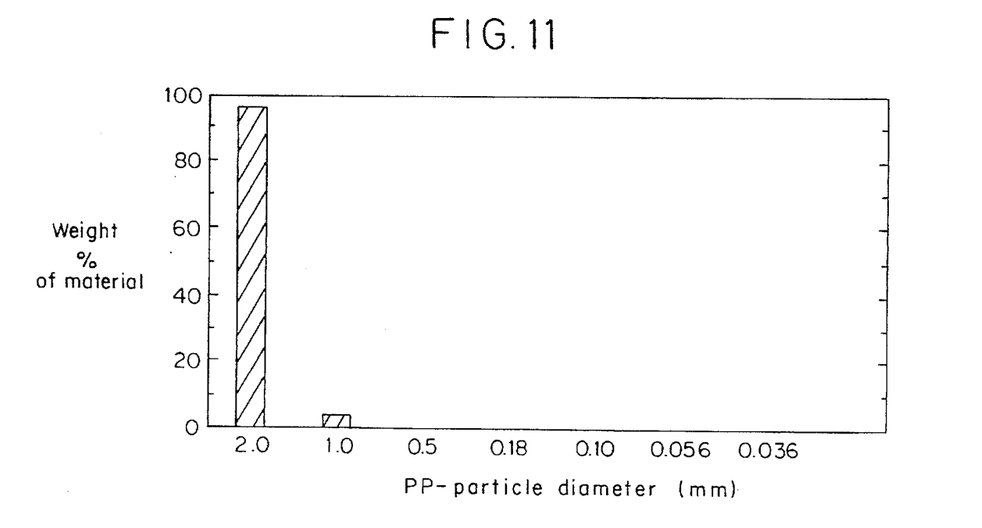
FIG. 11. The particle size distribution of a polymer sample produced using a catalyst doped with 30% manganese.

The particle size distribution measurements correlate well with the observations made regarding the morphology of the support material. Good morphology was obtainable with doping values up to 30%, whereafter the polymer particles showed a collapsing behavior similar to that of procatalyst particles, whereby a large proportion of fines was produced. The best results with respect to the particle size distribution were achieved with a magnesium doping percentage of 30. The particle size distribution of this polymer sample is shown in FIG. 11.

The bulk densities of the polymer materials are listed in Table 11. The values seem to decrease as the Mn-doping percentages increase. This seems to be due, first, to the fact that an increasing particle size automatically causes a decrease in the bulk density and, second, to the fact that a strongly doped catalyst produces irregular particles which reduce the bulk density. The bulk densities of the polymer samples are shown as a function of the Mn-doping concentration also in FIG. 10.

TABLE 11

Bulk densities of polymer samples produced using Mn-doped procatalysts

| Example | Mol-% Mn added | Bulk density g/ml |
| --- | --- | --- |
| 1 | 0 | 0.44 |
| 2 | 3 | 0.44 |
| 3 | 10 | 0.37 |
| 4 | 30 | 0.37 |
| 5 | 60 | 0.43 |
| 6 | 100 | 0.29 |

The melt indices of the polymer samples are shown in Table 12. They seem to vary very little within a range of 0–60% Mn. Thus it can be stated that the melt index measurements yielded rather satisfactory results, although at 10% the melt index drops somewhat.

TABLE 12

Melt indices of polymer samples produced using Mn-doped procatalysts

| Example | Mol-% Mn added | Melt index (2.16 kg) |
| --- | --- | --- |
| 1 | 0 | 10.0 |
| 2 | 3 | 10.1 |
| 3 | 10 | 6.8 |
| 4 | 30 | 13.2 |
| 5 | 60 | 12.5 |
| 6 | 100 | approx. 3000 |

The specific target of interest in the present work is the molecular weight distribution of the polymer produced, for the idea is to produce in the catalyst differentiated active sites and thereby to form in the polymerization polymer chains of a variety of lengths. The analytical results obtained are listed in Table 13, and they are shown graphically in FIG. 12.

TABLE 13

Molecular weight distributions of polymer samples produced using Mn-doped procatalysts

| Example | Mol-% Mn | $\bar{M}_n$ | $\bar{M}_w$ | $\bar{M}_v$ | D |
| --- | --- | --- | --- | --- | --- |
| 1 | 0 | 85900 | 286000 | 242000 | 3.3 |
|   |   | 83200 | 297000 | 248000 | 3.6 |
| 2 | 3 | 52900 | 328000 | 247000 | 6.2 |
|   |   | 53700 | 324000 | 244000 | 6.0 |
| 3 | 10 | 57100 | 382000 | 285000 | 6.7 |
|   |   | 56400 | 392000 | 288000 | 7.0 |
| 4 | 30 | 53600 | 298000 | 229000 | 5.6 |
|   |   | 53600 | 306000 | 237000 | 5.7 |
| 5 | 60 | 59400 | 297000 | 233000 | 5.0 |
|   |   | 58900 | 292000 | 228000 | 5.0 |
| 6 | 100 | 31200 | 154000 | 123000 | 4.9 |
|   |   | 30600 | 161000 | 127000 | 5.3 |

Figure 12:
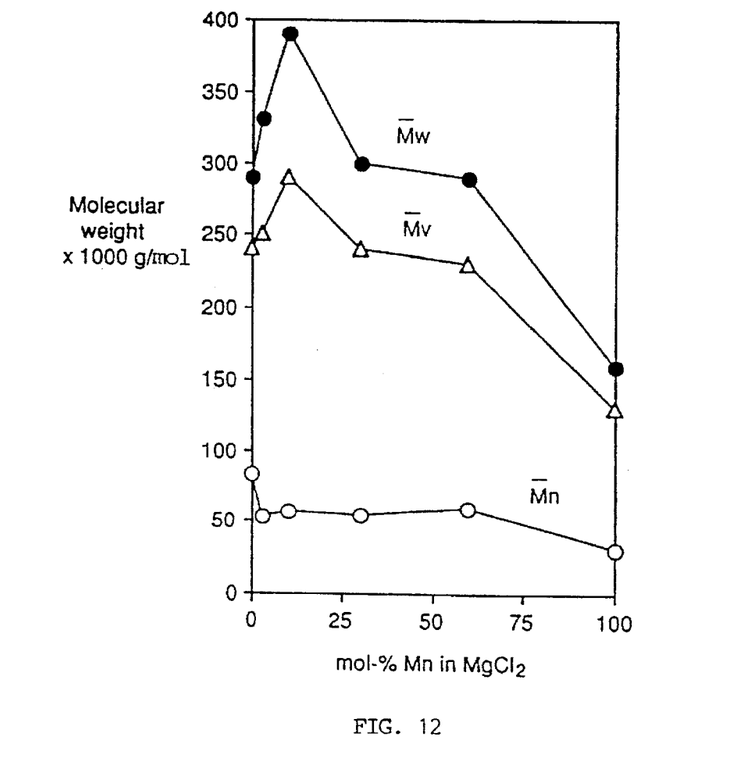
FIG. 12. Molecular weights of the polymer samples as a function of the molar percentage of manganese in the procatalyst support material.

As can be seen in FIG. 12, the entire molecular weight, but especially the viscosity average molecular weight ($\bar{M}_v$) and the weight average molecular weight ($\bar{M}_w$), increase sharply when the molar percentage of manganese in the procatalyst increases from 0 to 10. At higher doping concentrations, however, there occurs a decrease of the molecular weight. The low molecular weights obtained with pure manganese (II) chloride may explain why the polymer products have a low isotacticity and a high melt index. The number average molecular weight ($\bar{M}_n$) drops sharply when the doping concentration increases from zero to three % Mn, but remains thereafter almost unchanged up to 60% Mn.

Figure 13:
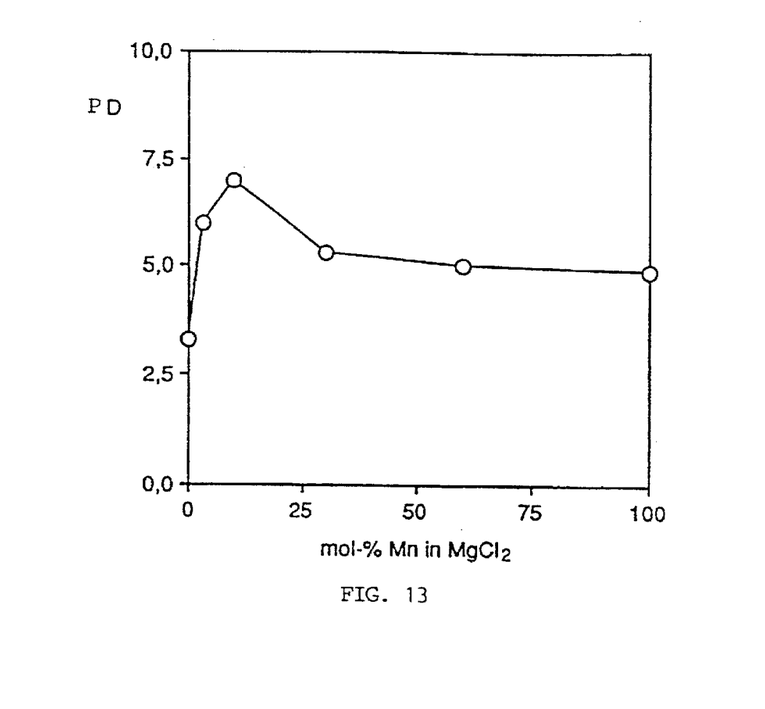
FIG. 13. Polydispersity of the polymer samples as a function of the molar percentage of manganese in the procatalyst support material.
Figure 14:
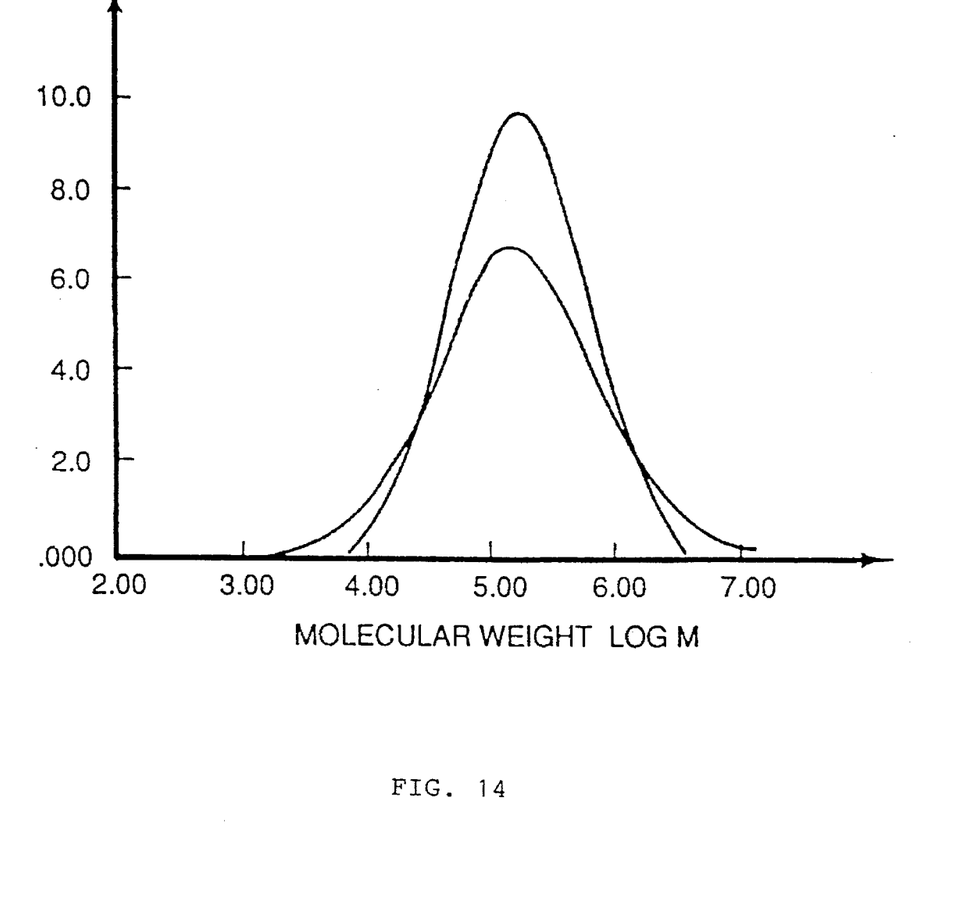
FIG. 14. Comparison between the molecular weight distribution (MWD) of a PP sample produced using a conventional catalyst and the molecular weight distribution of a PP sample produced using a Mn-doped catalyst.

Polydispersity, i.e. the ratio of weight average molecular weight to number average molecular weight, was also calculated from the molecular weight measurement results. FIG. 13 shows the polydispersity values as a function of the manganese concentration in the procatalyst. Polydispersity increased from the conventional value 3 up to 7 when the manganese concentration in the procatalyst increased from zero to 10 mol-% manganese (calculated from Mn+Mg). Thereafter, polydispersity dropped to a constant value of 5. FIG. 14 shows a comparison between a molecular weight distribution obtained with a polymer produced using an undoped procatalyst and the molecular weight distribution of a polymer produced using a procatalyst doped with 10% manganese.

The effect of a magnesium chloride support material doped with manganese can be seen as follows:

1. A very good polymer product morphology is obtained when the concentration of manganese (II) chloride is below 30%. Specifically with this manganese concentration the very best particular size distribution is obtained, in which case the polymer contains hardly any fines.
2. With the use of a doped procatalyst, large catalyst particles with a high mechanical strength were obtained, which for its part affected the above-mentioned good particle size distribution of the polymer.
3. The best activity was obtained with a manganese doping concentration of 10 mol-%, in which case the activity was up to 25% higher than the activity obtained using an undoped catalyst. A good activity was obtained without a decrease in isotacticity.
4. Doping also affected the molecular weight distribution by broadening it. Since obtaining a polymer with a broad molecular weight distribution had been set as a specific object of the invention, the optimal concentration of the doping metal was determined in this respect. The best results were obtained using a procatalyst doped with approx. 10 mol-% manganese (calculated from the total molar amount of manganese and magnesium). In this case, polydispersity increased to 7 from the conventional value 3.

We claim:

1. An olefin polymerization catalyst comprising:
   (1) a procatalyst component prepared by:
      (a) contacting magnesium chloride with methanol and/or ethanol and melting the mixture in the presence of manganese (II) halide added in an amount of at least about 0.1% and at most about 50%, based on the total molar amount of magnesium chloride and manganese (II) halide, thus forming a molten mixture,
      (b) atomizing the molten mixture and solidifying it by cooling to produce support material particles, and
      (c) reacting the support material particles with titanium tetrachloride.

2. The polymerization catalyst according to claim 1, wherein the manganese (II) halide is manganese (II) chloride.

3. The polymerization catalyst according to claim 1, wherein the concentration of manganese (II) halide is at least about 5% of the total molar amount of magnesium chloride and manganese (II) halide.

4. The polymerization catalyst according to claim 1, wherein the concentration of manganese (II) halide is at most about 40% of the total molar amount of magnesium chloride and manganese (II) halide.

5. The polymerization catalyst according to claim 1, wherein the amount of manganese (II) halide is in the range of about 8–15% of the total molar amount of magnesium chloride and manganese (II) halide, thereby maximizing the activity of the catalyst and providing a broad molecular weight distribution of the polymer.

6. The polymerization catalyst according to claim 1, wherein the manganese (II) halide concentration is about 25–35%, thereby enhancing the effect of the catalyst on the production of large polymer particles.

7. The polymerization catalyst according to claim 1, wherein the procatalyst component comprises about 10–20% magnesium, about 1–10% manganese, about 2–4% titanium, and at minimum about 45–60% chloride, calculated from the total weight of the procatalyst.

8. The polymerization catalyst according to claim 1, wherein step (c) further comprises reacting the magnesium chloride support material with an internal electron donor.

9. The polymerization catalyst according to claim 8, wherein the concentration of internal donor is about 10–25% by weight of the catalyst.

10. The polymerization catalyst according to claim 1, further comprising (2) an organometallic cocatalyst.

11. The polymerization catalyst according to claim 10, further comprising an external electron donor.

12. A method for the production of a procatalyst component for an olefin polymerization catalyst, comprising:

(a) contacting and mixing magnesium chloride, with methanol and/or ethanol, and about 0.1% to about 50% of manganese (II) halide, based on the total amount of magnesium chloride and manganese (II) halide, and melting the mixture to form a molten mixture, (b) atomizing the molten mixture, and solidifying it by cooling to produce support material particles, and (c) reacting the support material particles with titanium tetrachloride.

13. The method according to claim 12, wherein steps a) and b) are carried out by: (i) suspending a finely-divided magnesium chloride and a finely-divided manganese (II) halide into an inert, heat-resistant medium; (ii) adding to the suspension methanol and/or ethanol, and heating until the mixture of the salts and the alcohol becomes liquefied or melts to form melt drops in the medium; and (iii) contacting the medium and its melt drops with a cold material which preferentially dissolves the medium and solidifies the melt drops to form finished support material particles.

14. The method according to claim 12, wherein the manganese (II) halide is manganese (II) chloride.

15. The method according to claim 12, wherein the manganese (II) halide is added in step a) in an amount of at least about 5% of the total molar amount of magnesium chloride and manganese (I) halide.

16. The method according to claim 12, wherein the manganese (II) halide is added in step a) in an amount of at most about 40% of the total molar amount of magnesium chloride and manganese (II) halide.

17. The method according to claim 12, wherein step c) is carried out by causing the support material particles to react with an internal electron donor.

18. A method for producing polypropylene, comprising polymerizing propylene in the presence of a polymerization catalyst according to claim 1.

19. The method for producing polypropylene according to claim 18, wherein said polypropylene has a broad molecular weight distribution.

20. The method for producing polypropylene according to claim 18, wherein said catalyst further comprises an organoaluminum compound and an external electron donor.

21. The polymerization catalyst according to claim 5, wherein the amount of manganese (II) halide is about 10% of the total molar amount magnesium chloride and manganese (II) halide.

22. The polymerization catalyst according to claim 6, wherein the concentration of manganese (II) halide is about 30% of the total molar amount magnesium chloride and manganese (II) halide.

23. The polymerization catalyst according to claim 8, wherein said internal electron donor is an aromatic ester.

24. The polymerization catalyst according to claim 23, wherein said aromatic ester is di-isobutyl phthalate.

25. The polymerization catalyst according to claim 10, wherein said organometallic catalyst is a trialkyl aluminum.

26. The polymerization catalyst according to claim 25, wherein said trialkyl aluminum is triethyl aluminum.

27. The polymerization catalyst according to claim 11, wherein said external electron donor is selected from the group consisting of a silane, cineole, and an ether.

28. The polymerization catalyst according to claim 27, wherein said electron donor is selected from the group consisting of cyclohexyl-methyl-dimethoxysilane (CHMDMS), cineole and diphenyl-dimethoxysilane (DPDMS).

29. The method according to claim 17, wherein said internal electron donor is an aromatic ester.

30. The method according to claim 29, wherein said aromatic ester is di-isobutyl phthalate.

* * * * *